US007885263B2

(12) United States Patent
Sun et al.

(10) Patent No.: US 7,885,263 B2
(45) Date of Patent: Feb. 8, 2011

(54) MULTI-LINK RLP ENHANCEMENTS

(75) Inventors: Li-Hsiang Sun, San Diego, CA (US); Young C. Yoon, San Diego, CA (US); Suk Woo Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 487 days.

(21) Appl. No.: 11/840,150

(22) Filed: Aug. 16, 2007

(65) Prior Publication Data

US 2008/0084883 A1    Apr. 10, 2008

Related U.S. Application Data

(60) Provisional application No. 60/822,630, filed on Aug. 16, 2006, provisional application No. 60/823,500, filed on Aug. 24, 2006, provisional application No. 60/824,762, filed on Sep. 6, 2006, provisional application No. 60/863,551, filed on Oct. 30, 2006, provisional application No. 60/863,959, filed on Nov. 1, 2006.

(51) Int. Cl.
*H04L 12/28* (2006.01)

(52) U.S. Cl. .................. 370/392; 370/241; 370/242; 370/351; 370/389; 370/431; 370/464; 370/465; 370/473; 370/474

(58) Field of Classification Search .................. 370/392, 370/351, 389, 241, 242, 431, 464, 465, 473, 370/474
See application file for complete search history.

(56) References Cited

U.S. PATENT DOCUMENTS 6,496,477 B1   12/2002   Perkins et al.
6,961,326 B1 *  11/2005   Chang et al. ................ 370/338
7,047,473 B2    5/2006   Hwang et al.
2003/0035440 A1 * 2/2003   Casaccia et al. ............ 370/473
2003/0231598 A1  12/2003   Venkataraman et al.
2005/0111453 A1 * 5/2005   Mizutani .................... 370/390
2006/0256768 A1 * 11/2006   Chan ......................... 370/351

OTHER PUBLICATIONS

Attar et al, Evolution of CDMA2000 Cellular Networks: Multi-Carrier EV-DO, IEEE communications Magazine, Feb. 2006.*
Hofmann, Enabling Group Communications in Global Networks, Proceedings of Global Networking '97, Jun. 1997.*

* cited by examiner

*Primary Examiner*—Pankaj Kumar
*Assistant Examiner*—Gautam Sharma
(74) *Attorney, Agent, or Firm*—Lee, Hong, Degerman, Kang & Waimey

(57) ABSTRACT

A method for retransmitting packet data within a wireless communication network includes forming a plurality of subpackets for transmission along a route which was previously used to transmit a missing packet, such that the subpackets collectively include a header portion and a data portion of the missing packet to be retransmitted. The method may further include forming a first subpacket having a header portion and data portion, such that the header portion includes header data associated with a stream and route used to transmit the subpackets, and the data portion includes the header portion of the missing packet and data represented by only some of the data portion of the missing packet. An additional operation forms one or more additional subpackets which each include a header portion having header data associated with the stream and the route, and a data portion that includes only some of the data portion of the missing packet.

9 Claims, 8 Drawing Sheets

◯ : boundary of SAR

◯ : reprocessing bit

◯ : Indicators for un-fragmented SAR

MULTI-LINK RLP ENHANCEMENTS

CROSS-REFERENCE TO RELATED APPLICATIONS

Pursuant to 35 U.S.C. §119(e), this application claims benefit of priority from provisional patent applications Ser. Nos. 60/822,630, filed Aug. 16, 2006, 60/823,500, filed Aug. 24, 2006, 60/824,762, filed Sep. 6, 2006, 60,863,551, filed Oct. 30, 2006, and 60/863,959, filed Nov. 1, 2006, the contents of which are hereby incorporated by reference herein in their entirety.

BACKGROUND OF THE INVENTION

1. Field of the Invention

The present invention relates to wireless communications, and in particular, to retransmitting packet data within a wireless communication network.

2. Discussion of the Related Art

Ultra Mobile Broadband (UMB) combines the best aspects of CDMA, TDM, LS-OFDM, OFDM, and OFDMA into a single air interface using sophisticated control and signaling mechanisms and advanced antenna techniques in order to deliver ultra-high fixed and mobile broadband performance.

UMB supports a forward link up to 280 Mbps and a reverse link up to 68 Mbps while mobile and an average network latency of 16.8 msec. Furthermore, voice over IP (VoIP) of up to 500 simultaneous users is facilitated while mobile. Moreover, UMB will enable the convergence of IP-based voice, broadband data, multimedia, information technology, entertainment and consumer electronic services.

UMB can efficiently support OFDMA MAC/Physical and fully support centralized as well as distributed access networks. Inter-access network interfaces are streamlined and fast layer 2 handoff is supported with seamless handoff across air interface revision boundaries.

FIG. 1 illustrates a UMB centralized access network support. As illustrated in FIG. 1, each access terminal (AT) maintains a separate protocol stack for each access network (AN) in the active set, with each protocol stack called a "route." Furthermore each base station controller (BSC) is a separate AN.

FIG. 2 illustrates a UMB distributed access network. As illustrated in FIG. 2, each AT in this network arrangement maintains a separate protocol stack for each AN in the active set and each cell is a separate AN.

UMB simplifies the inter-AN interface by requiring each AT to support multiple routes. A simpler inter-eBS interface leads to standardized, inter-operable implementations.

Each eBS in the active set uses a separate data route and there is no need to transfer RLP and header compression states between eBSs. Traffic flowing between an eBS and an AT can be tunneled through the serving eBS, thereby supporting fast and seamless re-pointing between cells.

Signaling messages of protocols between an eBS and an AT can be tunneled through the serving eBS. No eBS has to maintain a connection state of other eBSs in the active set.

UMB layering also reduces the number of protocols in the data path. FIG. 3 illustrates UMB layers in which the application layer provides a signaling application, IP, RoHC, EAP and inter-technology tunneling. The radio link layer provides RLP and associated protocols. The MAC layer provides a packet consolidation protocol and control of physical layer channels. The physical layer defines characteristics of air interface channels. The security functions are protocols for ciphering, message integrity, and key exchange. The route control plane controls the creation and maintenance of air interface protocol stacks, one for each eBS. The session control plane provides session negotiation. The connection control plane controls the connection between the AT and an eBS.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment, a method for retransmitting packet data within a wireless communication network includes forming a plurality of subpackets for transmission along a route which was previously used to transmit a missing packet, such that the subpackets collectively comprise a header portion and a data portion of the missing packet to be retransmitted. The method may further include forming a first subpacket of the subpackets to comprise a header portion and a data portion, such that the header portion of the first subpacket comprises header data associated with a stream and route used to transmit the subpackets, and the data portion comprises the header portion of the missing packet and data represented by only some of the data portion of the missing packet. An additional operation includes forming one or more additional subpackets of the subpackets, such that each of the one or more additional subpackets comprise a header portion having header data associated with the stream and the route, and a data portion that includes only some of the data portion of the missing packet.

In one aspect, the method further includes determining a need to fragment the missing packet of a plurality of original packets transmitted to a receiving entity.

In another aspect, the receiving entity includes either a network entity or an access terminal.

In yet another aspect, the header portion of each of the plurality of subpackets includes a sequence number, and a first flag for indicating if an associated subpacket is a first subpacket, and a second flag for indicating if the associated subpacket is a last subpacket.

In still yet another aspect, the method further includes transmitting the subpackets using a transmission stream which is identical to a transmission stream used to transmit the missing packet.

In one feature, the method further includes transmitting the subpackets using a transmission stream which differs from a transmission stream used to transmit the missing packet.

In another feature, the method further includes identifying the missing packet requiring retransmission.

In accordance with an alternative embodiment, a method for assigning sequence numbers to packet data transmitted using separate channels includes transmitting a plurality of packets to an access terminal (AT) using a plurality of channels, and determining if a negative acknowledgement (NACK) has been received for a previously transmitted packet of the plurality of packets. A further operation includes assigning a quick-NACK sequence number to each of the packets according to the channel on which the packet is transmitted and relative order in which the packet is transmitted, such that the assigned quick-NACK sequence number is effectively decremented by an amount equal to a last-transmitted continuous number of packets for which a quick- NACK sequence number has been assigned, which were transmitted on the channel, and for which a NACK has been received.

In one aspect, the method further includes assigning a segmentation and reassembly (SAR) sequence number to each of the packets according to an order in which the packets are transmitted.

These and other embodiments will also become readily apparent to those skilled in the art from the following detailed description of the embodiments having reference to the attached figures, the invention not being limited to any particular embodiment disclosed.

BRIEF DESCRIPTION OF THE DRAWINGS

The above and other aspects, features, and advantages of the present invention will become more apparent upon consideration of the following description of preferred embodiments, taken in conjunction with the accompanying drawing figures, wherein.

DETAILED DESCRIPTION OF THE PREFERRED EMBODIMENTS

Figure 1:
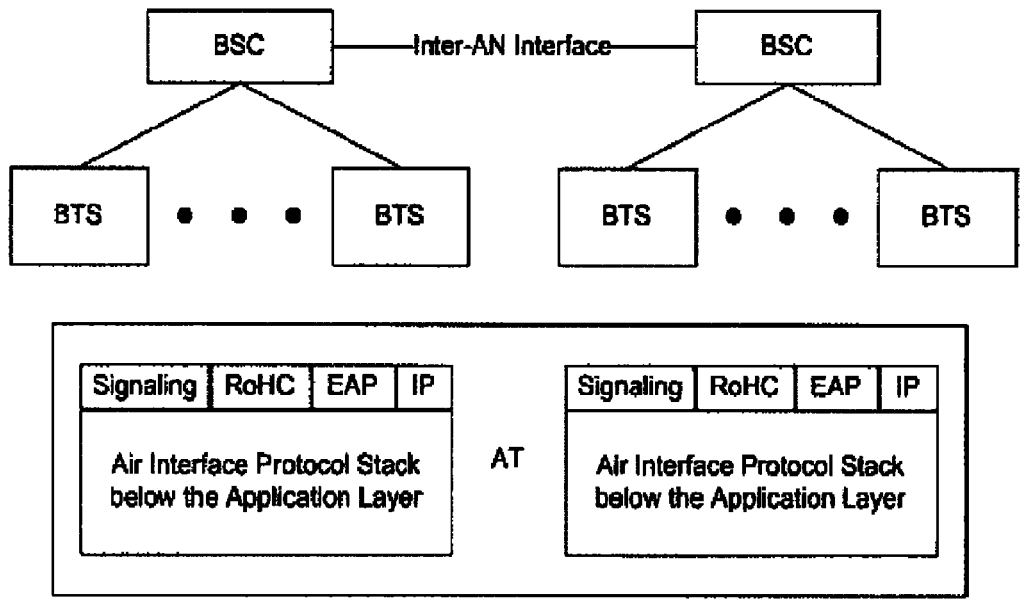
FIG. 1 illustrates a UMB centralized access network.
Figure 2:
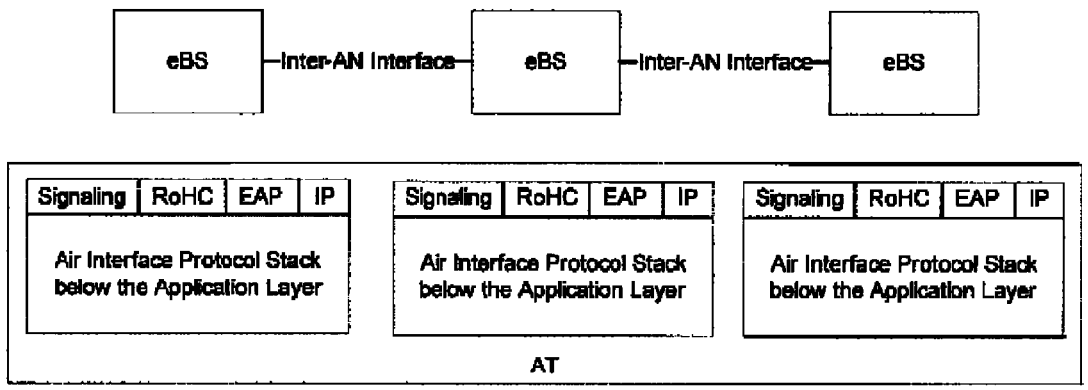
FIG. 2 illustrates a UMB distributed access network.
Figure 3:
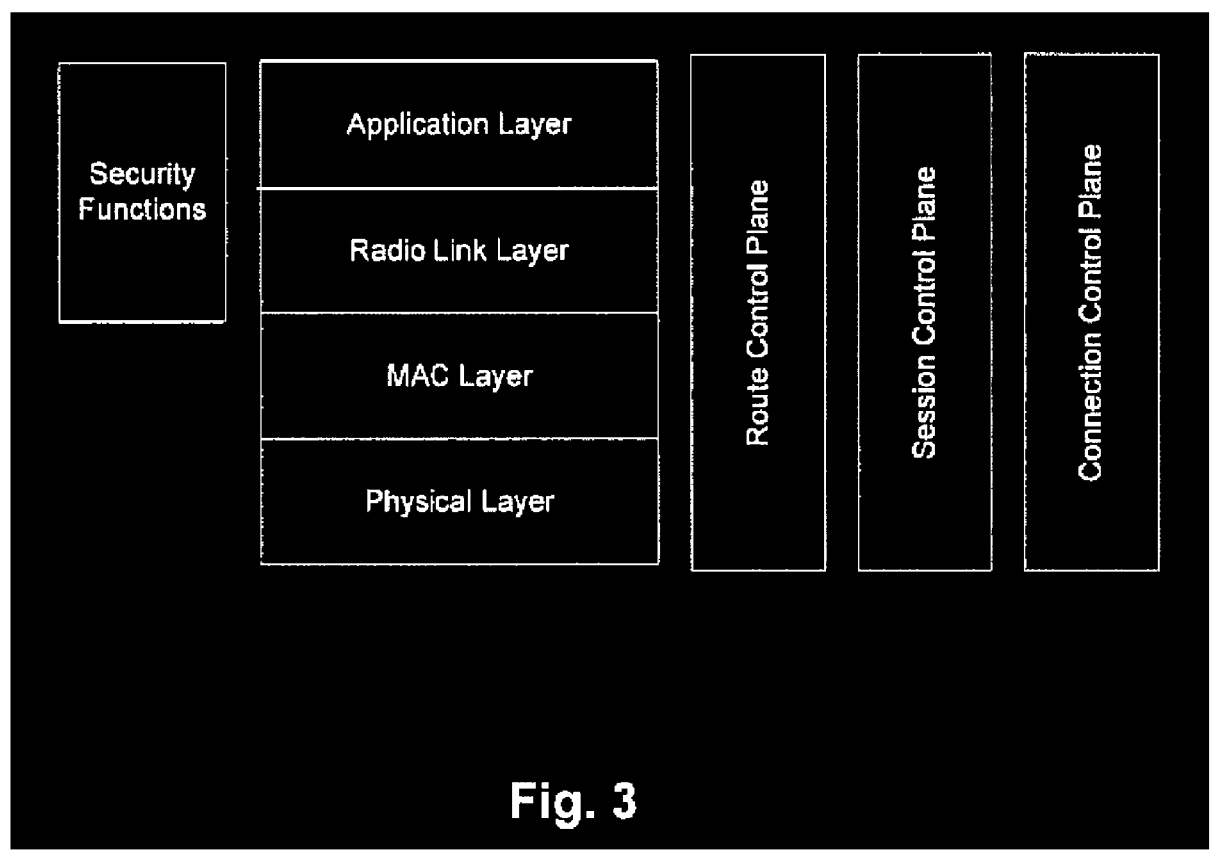
FIG. 3 illustrates UMB layers in which the application layer provides a signaling application, IP, RoHC, EAP and inter-technology tunneling.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

It is common in an existing RLP for the BSC to fragment upper layer packets into smaller fragments for a packet stream. This commonly occurs because the BSC, for example, does not know the payload size that will be used at the BTS. An approach to minimize or eliminate these issues is to frame / fragment a packet stream upper layer packet with an octet-based sequence number.

A packet with an octet-based sequence number typically can be fragmented into smaller pieces for retransmission because each byte has an associated sequence number. However, a packet with a packet-based sequence number in the first transmission cannot be fragmented for retransmission because there is only one number associated with the whole packet. The cost of the octet-based sequencing is that it results in a relatively large sequence length, which typically is long enough to ensure no wrap-around in an abort timer period. The cost of packet-based sequencing is that the retransmissions of the packet cannot be fragmented to smaller pieces if the channel condition only allows a small packet.

To have the benefit of low-overhead from packet-based sequencing, and to remove the limitation on fragmentation in retransmissions, the following approach is used:

Tunnel the retransmitted packet in a same or a different stream:

Tunneling is to treat the retransmitted packet (with header and data) as payload data of the tunneling stream. The tunneling stream can allocate a sequence number for each fragment in its own header such that the retransmitted packet can be fragmented into small pieces.

Another problem with packet-based sequencing is that the entity allocating the sequence number (BSC) does not know whether a packet framed by itself is small enough to fit in a physical layer packet transmitted by BTS. The current approach with packet-based sequencing for this problem is that BSC fragments an upper layer packet into very small fragments. BSC allocates each fragment with a unique sequence number. The BSC then sends these small fragments to the BTS for framing and transmission. The problem with this approach is that the benefit of low header overhead from packet-based sequencing is diminished because every small fragment needs to have a header. The following describe approaches for addressing this problem.

In many cases, the BSC provides a segmentation and reassembly (SAR) sequence number, and the BTS provides a QN sequence number, and attaches a radio link protocol (RLP) header (e.g., the LSB SAR+QN) to the payload. To reduce overhead, one partial SAR sequence (Least Significant Bits of SAR sequence number) is prepended with a QN number. In an embodiment, the BTS, for example, may fragment the SAR packet to fit in a smaller physical layer packet. In this example, the BTS can prepend each fragment with a different QN number such that the QN number is used to identify each SAR fragment. The benefit of this approach is that when the BSC allocates a packet-based SAR sequence number to a SAR packet, it does not need to be aware of the size of the physical layer packet. If fragmentation is needed, BTS frames the multiple fragments with an identical SAR sequence number but with different (consecutive) QN sequence numbers. Fragmentation is only done when it is needed. Note that this approach does not benefit the fragmentation of a retransmission because in the retransmission, the full length of the SAR is needed in the header, thus there is no additional space left for a QN sequence number. In this case, the above-described approach can be used.

Figures 4, 5, 6, 7:
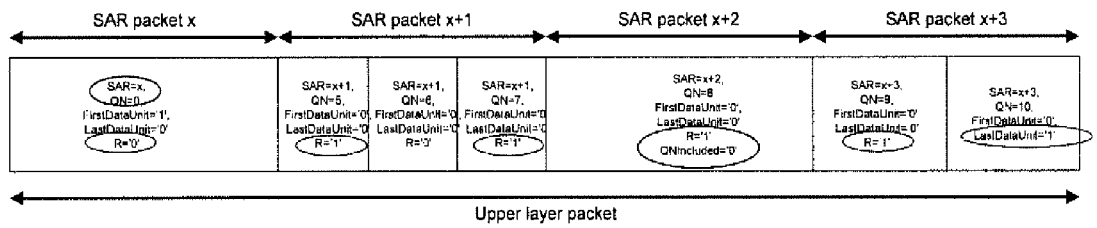
FIG. 4 depicts a fragmented SAR packet.
FIG. 5 depicts a fragmented SAR packet which includes a particular identifier.
FIG. 6 depicts a typical SAR packet that is not fragmented.
FIG. 7 depicts an embodiment using a tunneling (reprocessing) bit, a QNIncluded bit, and First/LastDataUnit bits to identify a SAR packet boundary for fragmented SAR packets, and to identify non-fragmented SAR packets.

A first approach is shown in FIG. 4, which depicts a fragmented SAR packet. A first consideration is to identify the boundary of the SAR packet. The figure illustrates the scenario in which it is difficult to identify an erased or missing packet that belongs to the SAR packet if the boundary of the SAR packet is not marked or otherwise identified.

FIG. 5 depicts a fragmented SAR packet which includes a particular identifier. In this example, there is a tunnel (reprocessing indicator) bit R, which is used to identify whether there is another packet tunneled as an upper layer packet in the RLP packet. This bit is typically only needed for the first RLP packet from an upper layer packet (e.g. an IP packet) and it is redundant in every other RLP packet. In an embodiment, this identifier bit R is used to signal or otherwise identify the beginning/end of a SAR. With this approach, the receiver may be able to ascertain to which SAR a lost fragment belongs. In the example of FIG. 5, the receiver knows that the erased fragment belongs to SAR packet 11.

When the tunnel bit R is applied to the packet with FirstDataUnit='1', it signals that the packet itself is a complete SAR packet, and the SAR packet is the first fragment of an upper layer packet. On the other hand, when this R bit is applied to the packet with FirstDataUnit='0', it signals that the packet itself is a complete SAR packet, and the SAR packet is the last fragment of an upper layer packet.

Note that with regard to cell switching, if the fragments of a SAR packet have not been completely transmitted on a QN instance, and a cell switching event occurs, the SAR packet may be retransmitted on the new QN instance.

FIG. 6 depicts a typical SAR packet that is not fragmented, and is neither a packet with FirstDataUnit='1' nor LastDataUnit='1' which is a fragment of upper layer payload (i.e., the packet is both the first and last segment of a SAR). In this scenario, utilizing the tunneling R bit does not usually assist in identifying the erased packet as belonging to a particular SAR packet. As shown in FIG. 6, the receiver is typically unable to accurately determine if the SAR packet 11 is successfully received. Provided below are mechanisms to identify a non-fragmented SAR packet.

FIG. 7 depicts an embodiment using a tunneling (reprocessing) bit, a QNIncluded bit, and First/LastDataUnit bits to identify SAR packet boundary for fragmented SAR packets, and to identify non-fragmented SAR packets.

- For SAR packet x, it is the $1^{st}$ SAR packet from an upper layer packet (FirstDataUnit=1). The tunneling bit (R) is used for its original purpose to indicate whether the upper layer packet is a tunneled RLP packet. A reserved QN=0 is used to indicate that SAR packet x is a non-fragmented SAR packet.
- An alternative approach is illustrated in SAR packet x+2. The combination of R=1 and QNIncluded=0 indicates that it is a non-fragmented SAR packet with a QN sequence number. This approach uses the regular QN sequence number instead of a reserved one, such that the missing packets before the packet in this QN instance can be detected.
- In the $1^{st}$ and $3^{rd}$ fragment of SAR packet x+1 and the $1^{st}$ fragment of SAR packet x+3, the R bit is used to identify the SAR boundaries.
- In the $2^{nd}$ fragment of SAR packet x+3, LastDataUnit=1 is used to identify the end of SAR because the end of an upper layer packet (LastDataUnit) is also the end of the SAR.

As an example alternative to the first of the four examples noted above, if the LastDataUnit='1' and the R bit are set, such a scenario may be used to indicate that the upper layer payload is a tunneled packet. However, if the R bit is used to signal tunneling, it is typically not used to identify whether the packet is a complete SAR packet. To compensate, if the R bit is used to signal tunneling, a reserved QN may be used for signaling that it is a non-fragmented SAR packet (e.g., LastDataUnit='1', the R bit is set, and the QN sequence is a reserved number). This may indicate that the upper layer payload is a tunneled packet, and that the packet itself is a complete SAR packet which is the last fragment of the upper layer packet.

This principle may be similarly applied to the packet with FirstDataUnit='1'. For instance, for a packet with FirstDataUnit='1' and the LastDataUnit='1', the signaling of whether it is a complete SAR is usually not needed. The packet is a complete SAR. Note further this proposal of using the R bit and reserved QN is typically only applied to first-time transmissions of the packet.

In general, any header fields which are related to an upper layer packet may be used for other purposes on a per SAR/RLP packet basis. It is understood that the above-described examples utilize a tunneling R bit for the purpose of marking the first/last fragments of a RLP/SAR packet. If other flags for upper layer packets are available, such as encryption and KeyChange indication flags for an upper layer security packet, these bits may also be reused or otherwise implemented for first/last fragment marking.

Figure 8:
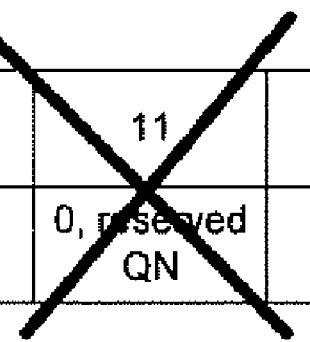
FIG. 8 depicts a SAR packet in which the QN numbers are continuous and the receiver is unable to identify that the packet with the reserved QN is missing.

FIG. 8 depicts a SAR packet in which the QN numbers are continuous and the receiver is unable to identify that the packet with the reserved QN is missing. Note that the introduction of a reserved QN may result in not being able to detect the erasure on the QN instance.

In view of this potential problem by using a reserved QN to identify all non-fragmented SAR packet, the upper layer packet may be sent on the same QN instance. SAR packets from the same upper layer packet have continuous SAR sequence numbers. Accordingly, a quick-NACK may be triggered by the following:

- A first-time packet received with a FirstDataUnit='1' and a previous first-time packet received on the same QN has LastDataUnit='0'
- A first-time packet received with a FirstDataUnit='0' and a SAR hole in front of the packet
- A QN hole.

The approach outlined in FIG. 7 may be used without requiring all fragments of upper layer packets on the same QN instance because the usage of a reserved QN is minimized to only the $1^{st}$ SAR packet from the upper layer packet. The other non-fragmented SAR packets are identified by the combination of R=1 and QNIncluded=0 such that a regular QN number can be used as usual.

For example, the second identified scenario may be used to detect the hole in the SAR packet identified in FIG. 8. Note the restriction of sending an upper layer packet on the same QN instance is often needed because of the use of the reserved QN number for signaling a non-fragmented SAR/PLR packet. If there are 2 bits per SAR/RLP packet available for marking the boundary, then the restriction on sending an upper layer packet on the same QN instance is not needed (thus they may be sent on different QN instances) because the QN number may be used for erasure detection for the QN instance.

Figure 9:
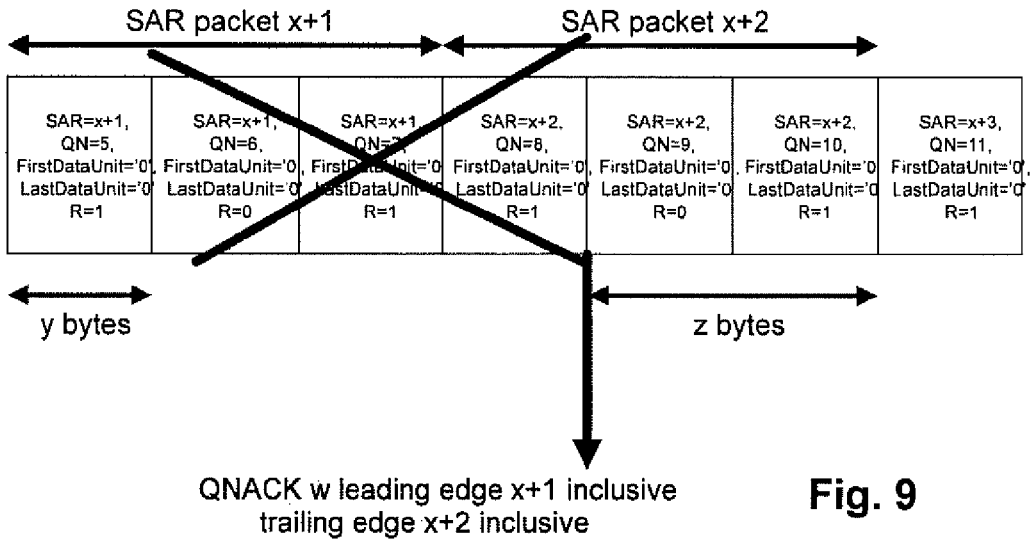
FIG. 9 is an example of the situation in which all of the SAR packets are NACKed.

One drawback for further fragmenting a SAR packet is that retransmission may include an entire SAR packet instead of just the missing fragment. This typically occurs since the BSC does not know the meaning of the QN sequence number, and the retransmission may be in another BTS/QN instance. FIG. 9 is an example of the situation in which all of the SAR packets (SAR packets x+1, x+2) are NACKed.

In an embodiment, the size of the retransmission may be minimized such that the AT includes in a quick-NACK a byte offset of the SAR packet from the leading edge of the SAR hole, and/or byte offset to the trailing edge.

Figure 10:
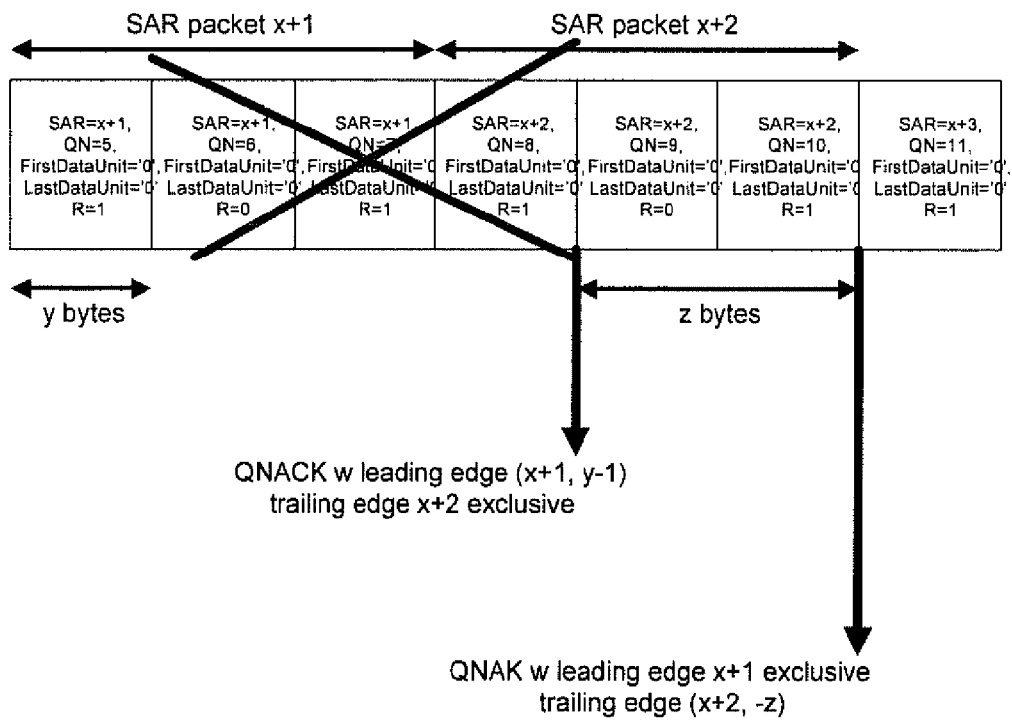
FIG. 10 is an example in which offset reporting is provided for a SAR packet.

FIG. 10 is an example in which offset reporting is provided for a SAR packet. In this example, the AN transmits only the lost portion of the SAR packet, and thus, does not retransmit the bytes surrounding the hole (i.e., before and after) and which have already been received.

Note that in this example, the AT can either report the hole in one NACK, thus requesting retransmission of the entire packet x+2, or NACK x+1 first, then wait to see if it receives the end of x+2 and reporting the offset from the end.

The AT may further include the QN sequence number with a NACK. If the retransmission is sent on the same QN instance, the BTS/channel card which keeps the QN mapping may send the lost fragment instead of the entire SAR packet.

To retransmit a partial SAR packet (either because of a byte offset NACK or a NACK with QN), the retransmission will typically indicate which portion of the SAR packet is retransmitted. In this scenario, it is useful to include an additional header.

One approach for adding an additional header is to tunnel this header with retransmitted payload inside of an RLP packet which has the retransmitted SAR sequence number. In a typical case, the tunneled packet includes a QNIncluded bit which may be set to 0. In a special header case, the special header may include a QNIncluded bit set to 1.

If an AT receives an RLP packet with sequence number X, and another packet is tunneled inside the RLP packet and which includes the same stream, route ID, and QN included bit set to 1, then the AT may interpret that the inside header is a so called special header, thus indicating that it is a partial retransmission of X.

In accordance with an embodiment, if the SAR packet for retransmission is to be fragmented, it may be tunneled inside of packets in the same or different flow/stream.

In accordance with further embodiments, scenarios in which a BTS does not fragment a SAR packet will now be considered. For instance, consider a signal from the AN to an AT which includes an attribute SARsize. The BSC may be configured to fragment an upper layer packet into SARsize bytes (or smaller if it is the last fragment of the upper layer packet). A SAR sequence number is typically incremented for each piece. When the BTS forms the SAR packet, it may combine multiple pieces from the same upper layer packet, and additionally use the sequence number of the first piece as the sequence number of the SAR packet.

When a receiver receives the SAR packet with sequence number X, for example, then it may calculate how many pieces have been received based on the size of the SAR packet payload using, for example, the following formula:

$$k = \left\lceil \frac{Payloadsize}{SARsize} \right\rceil$$

The receiver may therefore know that the pieces with sequence number x to x+k−1 are correctly received. Note that the current octet stream may be characterized as a special case of this approach in scenarios for which SARsize=1 byte.

In the reverse link, the AT will typically form packets to be transmitted for the 1$^{st}$ time which fit in the physical layer payloads without fragmentation. Accordingly, the foregoing approach may not be necessary.

Still further embodiments relate to duplicate NACK avoidance for multi-link RLP. A duplicate NACK may occur with quick-NACK if the receiver has already NACK'ed the missing packet through the regular NACK procedure (e.g., reporting missing packets, such as the delayed NACK or the NACK after receiving the flush).

To avoid a duplicate NACK, if the transmitter received a NACK that indicates missing packet x, for example, and packet x is the last packet with a QN sequence number sent on a QN instance Q (e.g., with QN sequence number y), then the QN sequence number of the next packet sent on the QN instance would typically be maintained as y.

Figure 11:
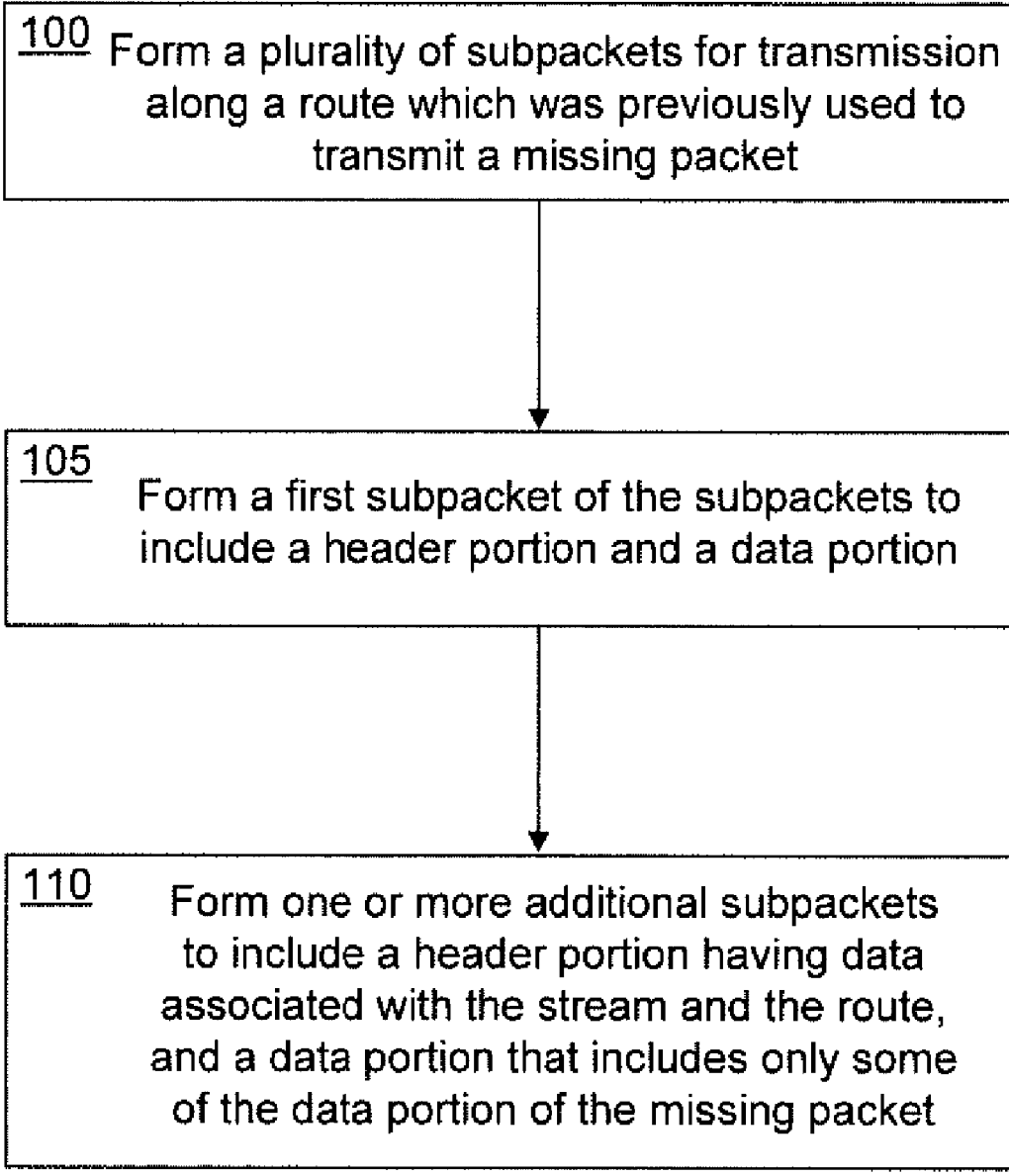
FIG. 11 is a flowchart depicting a method for retransmitting packet data within a wireless communication network.

FIG. 11 is a flowchart depicting a method for retransmitting packet data within a wireless communication network. Block 100 includes forming a plurality of subpackets for transmission along a route which was previously used to transmit a missing packet. In general, the subpackets collectively include a header portion and a data portion of the missing packet to be retransmitted.

Block 105 includes forming a first subpacket of the subpackets to include a header portion and a data portion. The header portion of the first subpacket comprises header data associated with a stream and route used to transmit the subpackets, and the data portion comprises the header portion of the missing packet and data represented by only some of the data portion of the missing packet.

Block 110 includes forming one or more additional subpackets, such that each of the additional subpackets includes a header portion having header data associated with the stream and the route, and a data portion that includes only some of the data portion of the missing packet.

Figure 12:
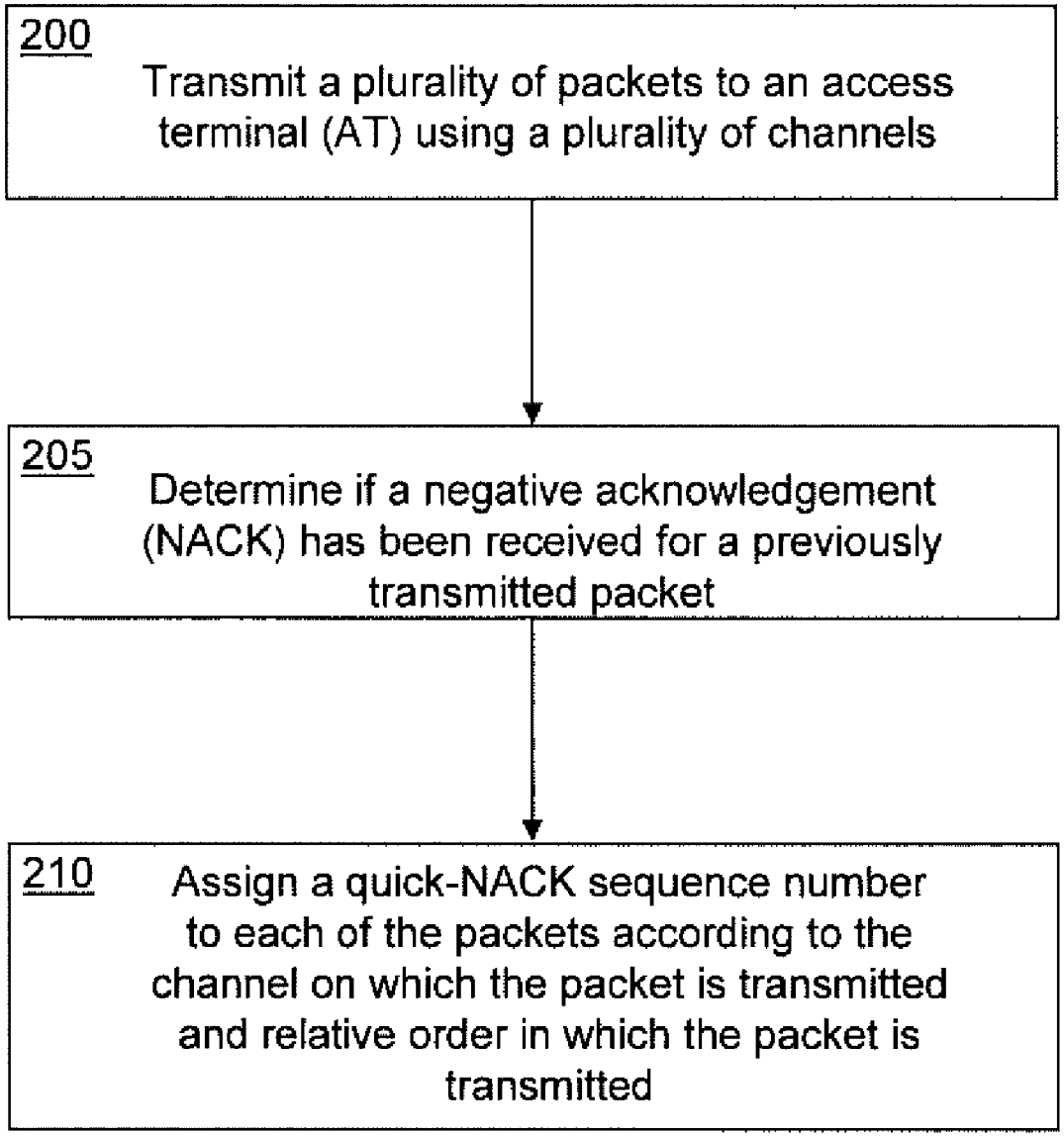
FIG. 12 is a flowchart depicting a method for assigning sequence numbers to packet data transmitted using separate channels.

FIG. 12 is a flowchart depicting a method for assigning sequence numbers to packet data transmitted using separate channels. Block 200 includes transmitting a plurality of packets to an access terminal (AT) using a plurality of channels. Block 205 includes determining if a negative acknowledgement (NACK) has been received for a previously transmitted packet of the plurality of packets.

Block 210 assigns a quick-NACK sequence number to each of the packets according to the channel on which the packet is transmitted and relative order in which the packet is transmitted, such that the assigned quick-NACK sequence number is effectively decremented by an amount equal to a last-transmitted continuous number of packets for which a quick-NACK sequence number has been assigned, which were transmitted on the channel, and for which a NACK has been received.

Figure 13:
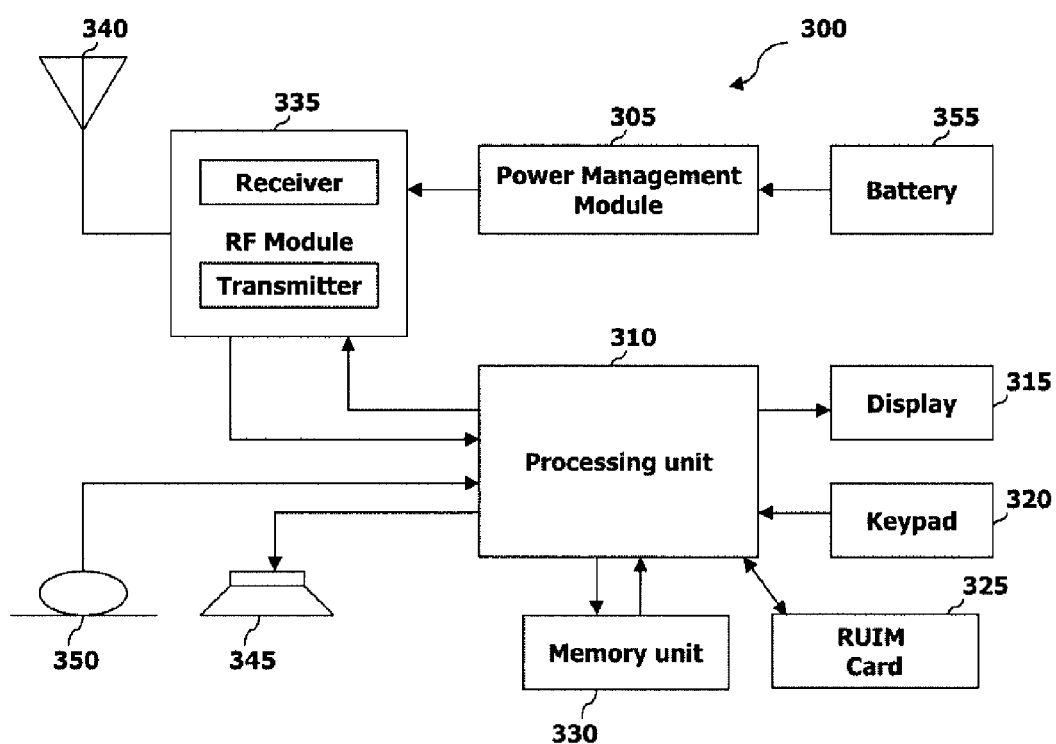
FIG. 13 is a block diagram of a mobile communication device which may be configured as an access terminal in accordance with embodiments of the present invention.

FIG. 13 is a block diagram of mobile communication device 300, which may be configured as a UE in accordance with embodiments of the present invention. Device 300 is illustrated, for example, as a mobile phone and may be configured to perform various methods described herein. The mobile communication device 300 includes a processing unit 310 such as a microprocessor or digital signal processor, RF module 335, power management module 305, antenna 340, battery 355, display 315, keypad 320, optional removable user identity module (RUIM) card 325, memory unit 330 such as flash memory, ROM or SRAM, speaker 345 and microphone 350.

A user enters instructional information, such as a telephone number, for example, by pushing the buttons of keypad 320 or by voice activation using microphone 350. Processing unit 310 receives and processes the instructional information to perform the appropriate function, such as to dial the telephone number. Operational data may be retrieved from memory unit 330 to perform the function. Furthermore, processing unit 310 may display the instructional and operational information on display 315 for the user's reference and convenience.

Processing unit 310 issues instructional information to RF section 335, to initiate communication, for example, transmit radio signals comprising voice communication data. RF section 335 comprises a receiver and a transmitter to receive and transmit radio signals. Antenna 340 facilitates the transmission and reception of radio signals. Upon receiving radio signals, RF module 335 may forward and convert the signals to baseband frequency for processing by processing unit 310. The processed signals would be transformed into audible or readable information outputted via speaker 345, for example.

Processing unit 310 is adapted to perform various methods disclosed herein, among other operation. It will be apparent to one skilled in the art that mobile communication device 300 may be readily implemented using, for example, processing unit 310 or other data or digital processing device, either alone or in combination with external support logic. Although the present invention is described in the context of mobile communication, the present invention may also be used in any wireless communication systems using mobile devices, such as PDAs and laptop computers equipped with wireless communication capabilities. Moreover, the use of certain terms to describe the present invention should not limit the scope of the present invention to certain type of wireless communication system, such as UMB. The present invention is also applicable to other wireless communication systems using different air interfaces and/or physical layers, for example, UMTS, TDMA, CDMA, FDMA, WCDMA, and the like.

The preferred embodiments may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The logic implementation shown in the figures described specific operations as occurring in a particular order. In alternative implementations, certain logic operations may be performed in a different order, modified or removed and still implement preferred embodiments of the present invention. Moreover, steps may be added to the above described logic and still conform to implementations of the invention.

Although the present invention may be implemented using the exemplary series of operations described herein, additional or fewer operations may be performed. Moreover, it is to be understood that the order of operations shown and described is merely exemplary and that no single order of operation is required.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for retransmitting packet data within a wireless communication network, the method comprising:
   forming a plurality of packets for transmission to a receiving entity along a route which was previously used to transmit a missing packet, wherein each of the packets comprises:
   a header portion comprising a segmentation and reassembly (SAR) sequence number, a first data unit bit and a tunneling bit for indicating a tunneled packet,
   and a data portion, wherein the data portions of the packets collectively comprise a header portion and a data portion of the missing packet to be retransmitted, and wherein the header portion of the missing packet comprises a protocol layer header which is at a protocol layer that is the same as a protocol layer of each of the header portions of the packets;
   forming a first packet of the packets such that the header portion of the first packet comprises header information associated with a route used to transmit the packets, and the data portion of the first packet comprises the header portion of the missing packet and data represented by only some of the data portion of the missing packet;
   forming a second packet of the packets such that the header portion of the second packet comprises header information associated with the route, and a data portion of the second packet comprises only some of the data portion of the missing packet, and
   fragmenting at least one of the plurality of packets to generate fragmented packets, wherein the fragmented packets each comprise the first data unit bit, the tunneling bit, and a different consecutive sequence number independent of the SAR sequence number, and
   wherein the fragmented packets are distinguished from the plurality of packets that are not fragmented using the tunneling bit and the first data unit bit,
   transmitting the formed plurality of packets and the fragmented packets to the receiving entity.

2. The method according to claim 1, wherein the receiving entity comprises a network entity.

3. The method according to claim 1, wherein the receiving entity comprises an access terminal.

4. The method according to claim 1, wherein the header portion further comprises, a first flag for indicating if an associated packet is the first packet and a second flag for indicating if the associated packet is the last packet.

5. The method according to claim 1, further comprising: transmitting the packets using a transmission stream which is identical to a transmission stream used to transmit the missing packet.

6. The method according to claim 1, further comprising: transmitting the packets using a transmission stream which differs from a transmission stream used to transmit the missing packet.

7. The method according to claim 1, further comprising: identifying the missing packet of original packets which require retransmission.

8. A method for assigning sequence numbers to packet data transmitted using separate channels, the method comprising:
   transmitting a plurality of packets to an access terminal (AT) using a plurality of channels;
   determining if a negative acknowledgement (NACK) has been received for a previously transmitted packet of the plurality of packets; and assigning one of a plurality of quick-NACK sequence numbers to each of the packets according to the channel on which the packet is transmitted and relative order in which the packet is transmitted; and effectively decrementing the assigned quick-NACK sequence number that is assigned to each of the packets by an amount equal to a number of last-transmitted continuous number of packets for which a quick-NACK sequence number has been assigned, and which were transmitted on the channel on which the packet is transmitted, and for which a NACK has been received.

9. The method according to claim 8, further comprising: assigning a segmentation and reassembly (SAR) sequence number to each of the packets according to an order in which the packets are received from the upper layer.

* * * * *